US009197488B2

United States Patent
Ishimura

(10) Patent No.: US 9,197,488 B2
(45) Date of Patent: Nov. 24, 2015

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventor: Takanari Ishimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/912,370

(22) Filed: Jun. 7, 2013

(65) Prior Publication Data
US 2014/0139865 A1 May 22, 2014

(30) Foreign Application Priority Data
Nov. 20, 2012 (JP) ................................. 2012-254393

(51) Int. Cl.
*G06K 15/00* (2006.01)
*H04L 12/24* (2006.01)
*H04L 29/08* (2006.01)

(52) U.S. Cl.
CPC ............ *H04L 41/0213* (2013.01); *H04L 67/16* (2013.01)

(58) Field of Classification Search
None
See application file for complete search history.

(56) References Cited

U.S. PATENT DOCUMENTS

| | | | | |
|---|---|---|---|---|
| 5,771,457 A | * | 6/1998 | Tsutsui | 455/463 |
| 6,006,272 A | * | 12/1999 | Aravamudan et al. | 709/245 |
| 6,157,950 A | * | 12/2000 | Krishnan | 709/223 |
| 6,208,656 B1 | * | 3/2001 | Hrastar et al. | 370/401 |
| 6,434,627 B1 | * | 8/2002 | Millet et al. | 709/245 |
| 6,463,061 B1 | * | 10/2002 | Rekhter et al. | 370/392 |
| 6,865,613 B1 | * | 3/2005 | Millet et al. | 709/245 |
| 7,315,903 B1 | * | 1/2008 | Bowden | 709/250 |
| 7,568,047 B1 | * | 7/2009 | Aysan et al. | 709/238 |
| 8,060,587 B2 | * | 11/2011 | Ahmad et al. | 709/223 |
| 8,392,998 B1 | * | 3/2013 | Schrecker et al. | 726/25 |
| 8,495,745 B1 | * | 7/2013 | Schrecker et al. | 726/25 |
| 2002/0038382 A1 | * | 3/2002 | Ryu et al. | 709/238 |
| 2002/0097182 A1 | * | 7/2002 | Goren et al. | 342/357.07 |
| 2002/0098852 A1 | * | 7/2002 | Goren et al. | 455/456 |
| 2002/0136210 A1 | * | 9/2002 | Boden et al. | 370/389 |
| 2002/0165982 A1 | * | 11/2002 | Leichter et al. | 709/244 |
| 2003/0016672 A1 | * | 1/2003 | Rosen et al. | 370/392 |
| 2003/0161295 A1 | * | 8/2003 | Shah et al. | 370/352 |
| 2004/0088542 A1 | * | 5/2004 | Daude et al. | 713/156 |

(Continued)

FOREIGN PATENT DOCUMENTS

JP 2006-331289 A 7/2006

*Primary Examiner* — Ted Barnes
(74) *Attorney, Agent, or Firm* — Sughrue Mion, PLLC

(57) ABSTRACT

An information processing apparatus includes a plurality of communication interfaces connected to a plurality of communication networks that are independent from each other, the plurality of communication interfaces each receiving data from a terminal connected to at least one of the plurality of communication networks, the plurality of communication interfaces each transmitting data to the terminal on a basis of terminal identification information, a first acquiring section that acquires the terminal identification information of a destination terminal, and service information indicating a service that can be executed in the destination terminal, a second acquiring section that acquires service information indicating a service that can be executed in a candidate terminal, and a selecting section that selects one of the plurality of communication interfaces on a basis of the service information of the destination terminal and the service information of the candidate terminal.

5 Claims, 3 Drawing Sheets

(56) References Cited

U.S. PATENT DOCUMENTS

| | | | |
|---|---|---|---|
| 2004/0093492 A1* | 5/2004 | Daude et al. | 713/156 |
| 2004/0240446 A1* | 12/2004 | Compton | 370/389 |
| 2004/0255329 A1* | 12/2004 | Compton et al. | 725/109 |
| 2005/0195823 A1* | 9/2005 | Chen et al. | 370/395.1 |
| 2006/0013211 A1* | 1/2006 | Deerman et al. | 370/389 |
| 2006/0088031 A1* | 4/2006 | Nalawade | 370/390 |
| 2006/0125690 A1* | 6/2006 | Goren et al. | 342/387 |
| 2006/0146184 A1* | 7/2006 | Gillard et al. | 348/398.1 |
| 2006/0146870 A1* | 7/2006 | Harvey et al. | 370/466 |
| 2006/0160545 A1* | 7/2006 | Goren et al. | 455/456.1 |
| 2006/0209832 A1* | 9/2006 | Keller-Tuberg | 370/392 |
| 2007/0064683 A1* | 3/2007 | Furukawa | 370/352 |
| 2007/0160034 A1* | 7/2007 | Koretsky | 370/352 |
| 2007/0281678 A1* | 12/2007 | Lipsit | 455/418 |
| 2008/0140822 A1* | 6/2008 | Torii | 709/223 |
| 2008/0198851 A1* | 8/2008 | Yamaguchi et al. | 370/392 |
| 2009/0077650 A1* | 3/2009 | Yoda et al. | 726/14 |
| 2009/0113035 A1* | 4/2009 | Ohashi | 709/223 |
| 2010/0074267 A1* | 3/2010 | Ladd | 370/401 |
| 2010/0169467 A1* | 7/2010 | Shukla et al. | 709/220 |
| 2010/0169878 A1* | 7/2010 | Seki et al. | 717/176 |
| 2011/0051736 A1* | 3/2011 | Takenouchi | 370/401 |
| 2011/0055416 A1* | 3/2011 | Chen et al. | 709/231 |
| 2011/0153815 A1* | 6/2011 | Aoki | 709/224 |
| 2011/0286466 A1* | 11/2011 | Ge et al. | 370/401 |
| 2011/0292922 A1* | 12/2011 | Yang | 370/338 |
| 2012/0014386 A1* | 1/2012 | Xiong et al. | 370/392 |
| 2012/0307263 A1* | 12/2012 | Ichikawa et al. | 358/1.8 |
| 2013/0016392 A1* | 1/2013 | Lee | 358/1.15 |
| 2013/0027741 A1* | 1/2013 | Liu | 358/1.15 |
| 2013/0103801 A1* | 4/2013 | Hansen et al. | 709/217 |
| 2013/0103817 A1* | 4/2013 | Koponen et al. | 709/223 |
| 2013/0107318 A1* | 5/2013 | Yamada | 358/1.15 |
| 2013/0145002 A1* | 6/2013 | Kannan et al. | 709/223 |
| 2013/0145008 A1* | 6/2013 | Kannan et al. | 709/223 |
| 2013/0197998 A1* | 8/2013 | Buhrmann et al. | 705/14.53 |
| 2013/0287026 A1* | 10/2013 | Davie | 370/392 |
| 2013/0340084 A1* | 12/2013 | Schrecker et al. | 726/25 |
| 2014/0016638 A1* | 1/2014 | Chen et al. | 370/390 |

* cited by examiner

FIG. 2

| COMMUNICATION INTERFACE 1 | | | | | COMMUNICATION INTERFACE 2 | | | | |
|---|---|---|---|---|---|---|---|---|---|
| USER | PC | IP ADDRESS | v3 | v1/v2 | USER | PC | IP ADDRESS | v3 | v1/v2 |
| USER 11 | PC 11 | 192.168.1.6 | ? | ? | USER 21 | PC 21 | 192.168.1.7 | × | ○ |
| USER 12 | PC 12 | 192.168.1.7 | ○ | — | USER 22 | PC 22 | 192.168.1.8 | ? | ? |
| USER 13 | PC 13 | 192.168.1.8 | ? | ? | USER 23 | PC 23 | 192.168.1.9 | ? | ? |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-254393 filed Nov. 20, 2012.

BACKGROUND

Technical Field

The present invention relates to an information processing apparatus, an information processing method, and a non-transitory computer readable medium.

SUMMARY

According to an aspect of the invention, there is provided an information processing apparatus including a plurality of communication interfaces connected to a plurality of communication networks that are independent from each other, the plurality of communication interfaces each receiving data from a terminal connected to at least one of the plurality of communication networks, the plurality of communication interfaces each transmitting data to the terminal on a basis of terminal identification information, the terminal identification information indicating a position of the terminal on the at least one of the plurality of communication networks, a first acquiring section that acquires the terminal identification information of a destination terminal that is a destination of data, and service information indicating a service that can be executed in the destination terminal, a second acquiring section that acquires service information indicating a service that can be executed in a candidate terminal, the candidate terminal being a candidate of a destination of data, the candidate terminal having the same terminal identification information as the terminal identification information of the destination terminal in each of the communication networks, and a selecting section that selects one of the plurality of communication interfaces on a basis of the service information of the destination terminal and the service information of the candidate terminal.

BRIEF DESCRIPTION OF THE DRAWINGS

Exemplary embodiment of the present invention will be described in detail based on the following figures, wherein:

FIG. 2 illustrates an example of information in a database; and

DETAILED DESCRIPTION

An information processing apparatus, an information processing method, and a non-transitory computer readable medium according to an exemplary embodiment of the invention will be described with reference to the figures.

Figure 1:
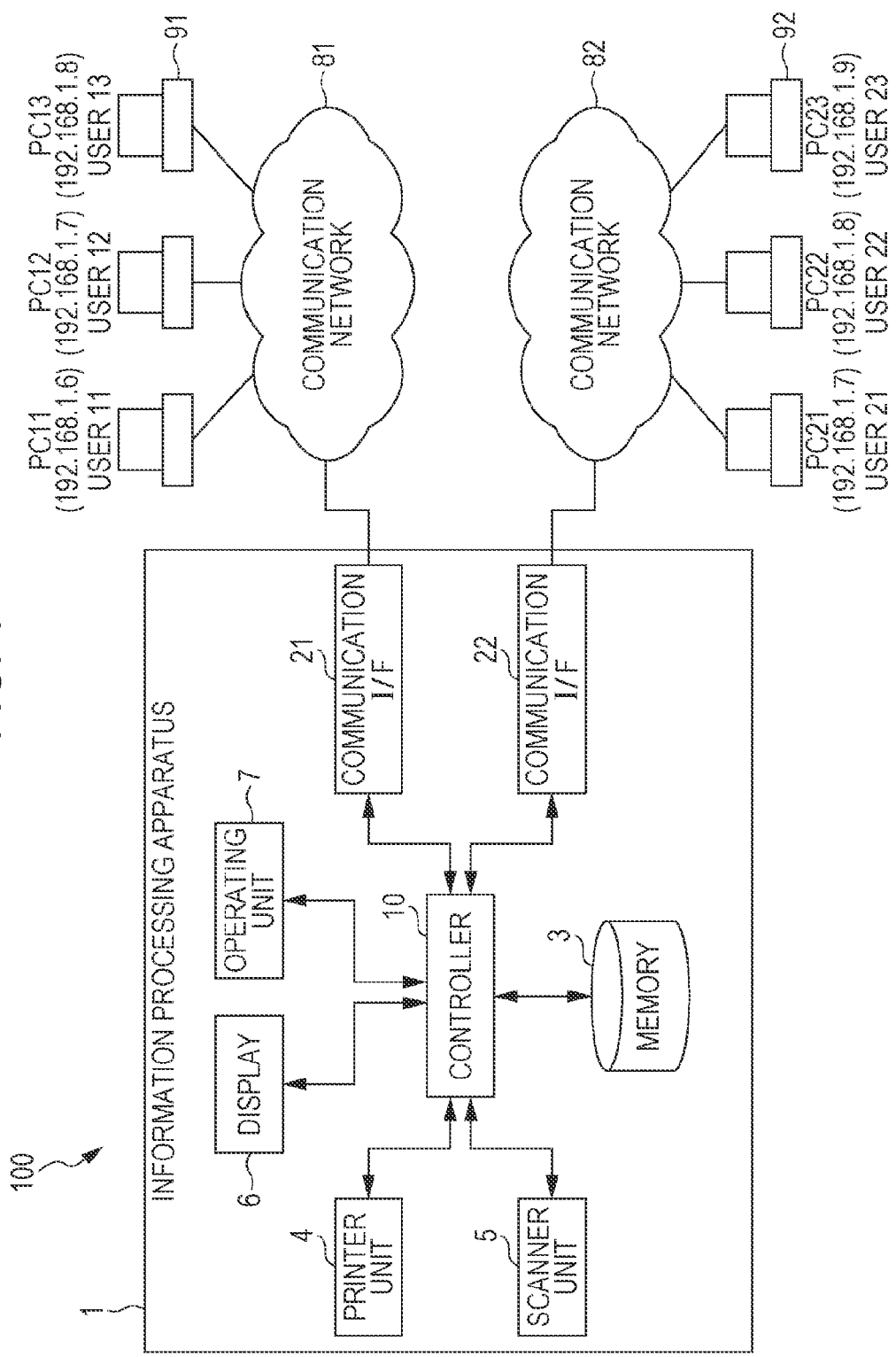
FIG. 1 illustrates a configuration example of an information processing system.

FIG. 1 illustrates a configuration example of an information processing system 100. The information processing system 100 includes an information processing apparatus 1, multiple terminals 91, and multiple terminals 92. The information processing apparatus 1 is connected to both of multiple communication networks 81 and 82 that are independent from each other. The multiple terminals 91 are connected to a first communication network 81. The information processing apparatus 1 and each of the terminals 91 can communicate data with each other via the first communication network 81. The multiple terminals 92 are connected to a second communication network 82. The information processing apparatus 1 and each of the terminals 92 can communicate data with each other via the second communication network 82.

The information processing apparatus 1 is configured as a piece of equipment including a function as a printer, and a function as a scanner. The information processing apparatus 1 includes a controller 10, multiple communication interfaces (I/Fs) 21 and 22, a memory 3, a printer unit 4, a scanner unit 5, a display 6, and an operating unit 7.

The controller 10 includes, for example, an arithmetic section such as a central processing unit (CPU) and a memory such as a random access memory (RAM), and executes information processing in accordance with a program. The program may be provided from a computer readable information recording medium such as a CD-ROM, or may be provided via a communication line such as the Internet.

The communication I/Fs 21 and 22 are pieces of equipment for communicating with other apparatuses (for example, the terminals 91 and 92) via the communication networks 81 and 82, respectively. The first communication I/F 21 is connected to the first communication network 81, and can communicate with each of the terminals 91. The second communication I/F 22 is connected to the second communication network 82, and can communicate with each of the terminals 92. Specifically, the communication I/Fs 21 and 22 pass data received from the terminals 91 and 92, respectively, to the controller 10. The communication I/Fs 21 and 22 also transmit data accepted from the controller 10 to the terminals 91 and 92, respectively.

The memory 3 is, for example, a hard disk drive (HDD) or a solid state drive (SSD). A database that can be accessed by the controller 10 is built in the memory 3. The database may be built in another apparatus different from the information processing apparatus 1.

The printer unit 4 is a unit that implements a function as a printer. The printer unit 4 forms an image on the surface of a medium in accordance with an instruction from the controller 10. The scanner unit 5 is a unit that implements a function as a scanner. The scanner unit 5 outputs image data read from the surface of a medium to the controller 10.

The display 6 is, for example, a liquid crystal display panel. The operating unit 7 is, for example, a touch panel.

Each of the terminals 91 and 92 is, for example, a personal computer. Each of the terminals 91 and 92 transmits data to the information processing apparatus 1, or receives data from the information processing apparatus 1. For example, each of the terminals 91 and 92 transmits a print job to the information processing apparatus 1, or receives image data from the information processing apparatus 1.

Generally, when specifying the destination of data, terminal identification information indicating a position on a communication network such as an IP address is used.

However, because the information processing apparatus 1 according to the exemplary embodiment is connected to the multiple communication networks 81 and 82 that are independent from each other, situations may arise in which it is not possible to specify the destination of data by use of the above-mentioned terminal identification information alone.

That is, situations may arise in which the terminal identification information of the terminal 91 connected to the communication network 81, and the terminal identification information of the terminal 92 connected to the communication network 82 overlap. In such situations, it is not clear to which one of these terminals 91 and 92 data should be transmitted.

Accordingly, in the exemplary embodiment, in view of the above-mentioned circumstances, the processing described below is executed.

In the exemplary embodiment, the information processing apparatus 1 and each of the terminals 91 and 92 can communicate with each other in accordance with Simple Network Management Protocol (SNMP). For example, the information processing apparatus 1 receives a data unit Get Request (hereinafter, simply referred to as "Get Request") including management information of each of the terminals 91 and 92, from each of the terminals 91 and 92. The information processing apparatus 1 also transmits a data unit Trap (hereinafter, referred to as Trap notification) which notifies when a problem such as a paper jam occurs, to each of the terminals 91 and 92.

Multiple versions exist for SNMP. Legacy Versions 1 and 2 and the latest Version 3 differ greatly in areas such as security. In the exemplary embodiment, it is assumed that some of the terminals 91 and 92 can execute Version 3 of SNMP, and other some of the terminals 91 and 92 cannot execute Version 3 of SNMP but can execute Versions 1 and 2 of SNMP.

FIG. 2 illustrates an example of information in a database. A history database storing information collected by the information processing apparatus 1 from the terminals 91 and 92 is built in the memory 3. In the history database, each of the communication I/Fs 21 and 22 is associated with user information, terminal information, terminal identification information, and SNMP version support information.

The user information is, for example, the log-on user name of each of the terminals 91 and 92. The terminal information is, for example, the terminal name of each of the terminals 91 and 92. The terminal identification information is, for example, the IP address of each of the terminals 91 and 92. These pieces of information are included in, for example, Get Request transmitted from each of the terminals 91 and 92 to the information processing apparatus 1. Each of the terminals 91 and 92 transmits Get Request to the information processing apparatus 1 at predetermined timing such as at activation, and the information processing apparatus 1 extracts various information from the received Get Request.

The SNMP version support information indicates, for example, whether or not each of the terminals 91 and 92 supports Version 3 (v3), and whether or not each of the terminals 91 and 92 supports Versions 1 and 2 (v1/v2). As will be described later, the SNMP version support information is acquired from each of the terminals 91 and 92 when the information processing apparatus 1 narrows down the node that is the destination of Trap notification.

The exemplary embodiment is not limited to this but acquisition of the SNMP version support information may be performed at predetermined timing. For example, the SNMP version support information may be acquired with reception of Get Request by the information processing apparatus 1 from each of the terminals 91 and 92 as a trigger, or may be acquired with communication between the information processing apparatus 1 and each of the terminals 91 and 92 via a protocol different from SNMP as a trigger. Moreover, the SNMP version support information may be acquired at activation of the information processing apparatus 1, when the information processing apparatus 1 receives an arbitrary packet, at predetermined time intervals, or the like.

Figure 3:
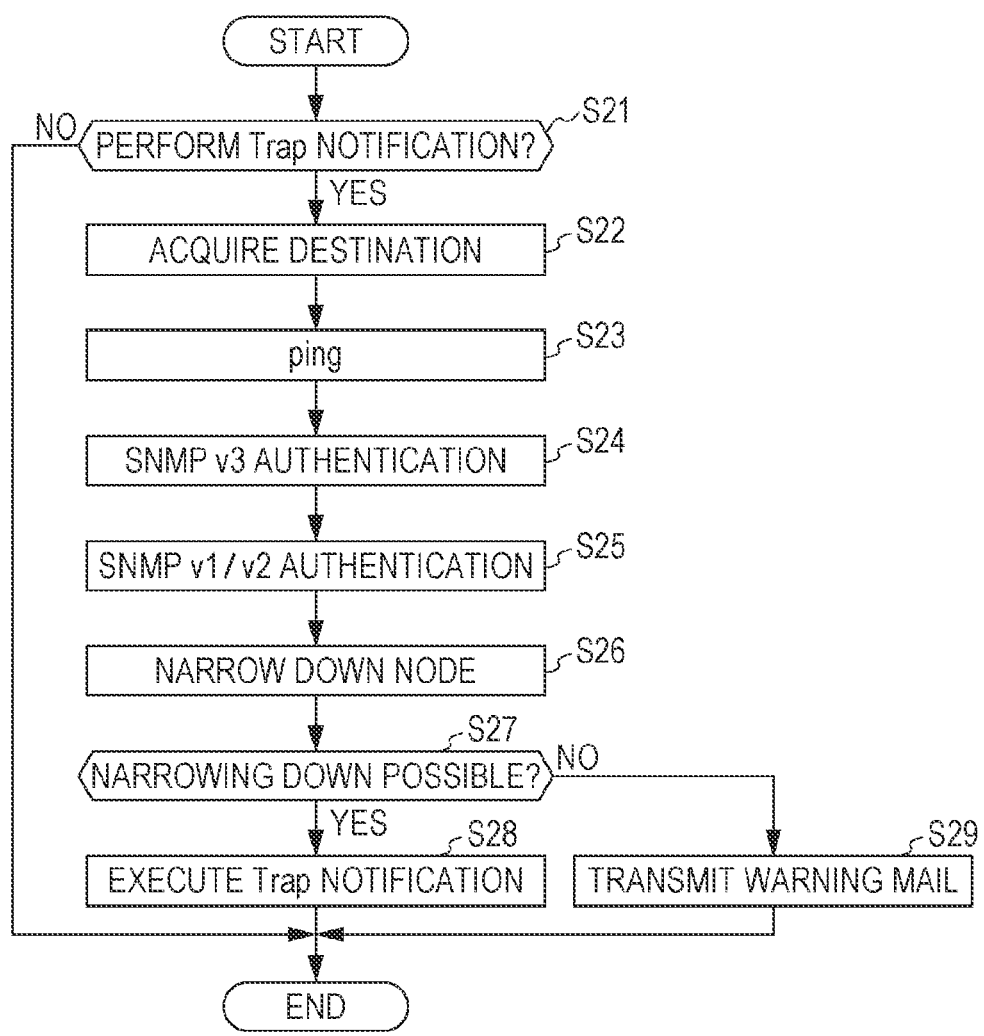
FIG. 3 illustrates an operation example of an information processing apparatus.

FIG. 3 illustrates an operation example of the information processing apparatus 1. The processing described below is implemented by execution of a program by the controller 10. The controller 10 functions as an example of a first acquiring section, a second acquiring section, and a selecting section.

The history database is built in the memory 3 as described above. The controller 10 can reference information stored in the history database.

In S21, the controller 10 determines whether or not to perform Trap notification. It is determined to perform Trap notification when, for example, a problem such as a paper jam has occurred. In a case where it is determined to perform Trap notification (S21: YES), the processing proceeds to S22.

In S22, the controller 10 acquires information of a destination terminal that is the destination of Trap notification. Information of a destination terminal includes, for example, the IP address of the destination terminal, and information of the SNMP version that can be executed in the destination terminal. Information of a destination terminal may also include user information indicating the user of the destination terminal. Information of a destination terminal is stored in advance in, for example, the memory 3. In this way, the controller 10 functions as an example of the first acquiring section that acquires information of a destination terminal.

Because the information processing apparatus 1 is connected to the multiple communication networks 81 and 82 that are independent from each other, there is a possibility that there may exist a node (terminal) having the same IP address as that of the above-mentioned destination terminal in each of the communication networks 81 and 82. Accordingly, by the following procedure, the controller 10 narrows down the node that is the destination of Trap notification.

In S23, the controller 10 outputs Packet Internet Grouper (ping) to the same IP address as that of the above-mentioned destination terminal in each of the communication networks 81 and 82, and checks whether or not there is a response.

In S24 and S25, the controller 10 acquires information of the SNMP version that can be executed in each node that has responded to ping. Specifically, authentication as to whether or not Version 3 (v3) of SNMP is supported is performed in S24, and authentication as to whether or not Versions 1 and 2 (v1/v2) of SNMP are supported is performed in S25. Each node that has responded to ping is a candidate terminal as a candidate of the destination of Trap notification, which has the same IP address as that of the above-mentioned destination terminal in each of the communication networks 81 and 82. In this way, the controller 10 functions as the second acquiring section that acquires information of the SNMP version that can be executed in each candidate terminal.

In S26, the controller 10 narrows down the node that is the destination of Trap notification, on the basis of the information of the SNMP version of the destination terminal acquired in S22 mentioned above, and the information of the SNMP version of each candidate terminal acquired in S24 and S25 mentioned above. Consequently, it is determined which one of the multiple communication I/Fs 21 and 22 is to be used for Trap notification. In this way, the controller 10 functions as an example of the selecting section that selects one of the multiple communication I/Fs 21 and 22.

For example, the controller 10 determines that it is possible to narrow down the node in a case where there is only one candidate terminal whose SNMP version information matches that of the destination terminal. Specifically, it is determined that it is possible to narrow down the node in a case where the destination terminal supports Version 3 of SNMP, and only one candidate terminal supports Version 3 of SNMP. Likewise, it is determined that it is possible to narrow down the node also in a case where the destination terminal supports Versions 1 and 2 of SNMP, and only one candidate terminal supports Versions 1 and 2 of SNMP.

The controller 10 determines that it is not possible to narrow down the node in a case where there are multiple or zero candidate terminals whose SNMP version information matches that of the destination terminal.

In a case where it is possible to narrow down the node (S27: YES), the processing proceeds to S28. In S28, the controller 10 sets the candidate terminal whose SNMP version information matches that of the destination terminal as the destination of Trap notification, and executes Trap notification by using one of the multiple communication I/Fs 21 and 22 that is selected as a result of this setting.

In a case where it is not possible to narrow down the node (S27: NO), the processing proceeds to S29, where the controller 10 transmits a warning mail indicating that it is not possible to narrow down the node to the administrator or the like.

While in the exemplary embodiment mentioned above the controller 10 acquires SNMP version information from each candidate terminal when narrowing down the node that is the destination of Trap notification, this should not be construed restrictively. The controller 10 may acquire SNMP version information from many terminals 91 and 92 in advance and store the acquired SNMP version information in the history database, and acquire the SNMP version information of each candidate terminal from the history database.

In addition, the controller 10 may use not only SNMP version information but also user information when narrowing down the node that is the destination of Trap notification. In this case, the controller 10 acquires user information of the destination terminal in S22 mentioned above, and acquires user information of each candidate terminal either directly from the candidate terminal or from the history database.

While the exemplary embodiment of the invention has been described above, the invention is not to be limited to the above-mentioned exemplary embodiment. Obviously, many modifications and variations will be apparent to practitioners skilled in the art.

What is claimed is:

1. An information processing apparatus comprising:
a plurality of communication interfaces connected to a plurality of communication networks that are independent from each other, the plurality of communication interfaces each receiving data from a terminal connected to at least one of the plurality of communication networks, the plurality of communication interfaces each transmitting data to the terminal on a basis of terminal identification information, the terminal identification information indicating a position of the terminal on at least one of the plurality of communication networks;
a first acquiring section configured to acquire the terminal identification information of a destination terminal that is a destination of data, and destination terminal service information indicating a service supported by the destination terminal;
a second acquiring section configured to acquire candidate terminal service information indicating a service supported by each of at least one candidate terminal, the at least one candidate terminal being a candidate destination of the data, the at least one candidate terminal having a same terminal identification information as the terminal identification information of the destination terminal; and
a selecting section configured to (i) determine a candidate terminal of the at least one candidate terminal on a basis of the determined candidate terminal having the candidate terminal service information that matches the destination terminal service information of the destination terminal, (ii) select a communication interface of the plurality of communication interfaces on a basis of the determined candidate terminal being connected to the selected communication interface, and (iii) connect the selected communication interface with the determined candidate terminal.

2. The information processing apparatus according to claim 1, wherein:
the first acquiring section is further configured to acquire destination terminal user information indicating a user of the destination terminal;
the second acquiring section is further configured to acquire candidate terminal user information indicating a user of each of the at least one candidate terminal; and
the selecting section is configured to select one of the plurality of communication interfaces on a basis of the destination terminal service information and the destination terminal user information of the destination terminal, and the candidate terminal service information and the candidate terminal user information of each of the at least one candidate terminal.

3. The information processing apparatus according to claim 1, wherein the destination terminal service information indicates a version of Simple Network Management Protocol (SNMP) supported by the destination terminal, and the candidate terminal service information indicates the version of SNMP supported by each of the at least one candidate terminal.

4. An information processing method for an information processing apparatus, the information processing apparatus including a plurality of communication interfaces connected to a plurality of communication networks that are independent from each other, the plurality of communication interfaces each receiving data from a terminal connected to at least one of the plurality of communication networks, the plurality of communication interfaces each transmitting data to the terminal on a basis of terminal identification information, the terminal identification information indicating a position of the terminal on at least one of the plurality of communication networks, the information processing method comprising:
acquiring the terminal identification information of a destination terminal that is a destination of data, and destination terminal service information indicating a service supported by the destination terminal;
acquiring candidate terminal service information indicating a service supported by each of at least one candidate terminal, the at least one candidate terminal being a candidate destination of the data, the at least one candidate terminal having a same terminal identification information as the terminal identification information of the destination terminal;
determining a candidate terminal of the at least one candidate terminal, on a basis of the determined candidate terminal having the candidate terminal service information that matches the destination terminal service information of the destination terminal;
selecting a communication interface of the plurality of communication interfaces on a basis of the determined candidate terminal being connected to the selected communication interface; and
connecting the selected communication interface with the determined candidate terminal.

5. A non-transitory computer readable medium storing a program causing a computer of an information processing apparatus to execute a process, the information processing apparatus including a plurality of communication interfaces connected to a plurality of communication networks that are independent from each other, the plurality of communication interfaces each receiving data from a terminal connected to at least one of the plurality of communication networks, the plurality of communication interfaces each transmitting data to the terminal on a basis of terminal identification information, the terminal identification information indicating a position of the terminal on at least one of the plurality of communication networks, the process comprising:

acquiring the terminal identification information of a destination terminal that is a destination of data, and destination terminal service information indicating a service supported by the destination terminal;

acquiring candidate terminal service information indicating a service supported by each of at least one candidate terminal, the at least one candidate terminal being a candidate destination of data, the at least one candidate terminal having a same terminal identification information as the terminal identification information of the destination terminal;

determining a candidate terminal of the at least one candidate terminal, on a basis of the determined candidate terminal having the candidate terminal service information that matches the destination terminal service information of the destination terminal;

selecting a communication interface of the plurality of communication interfaces on a basis of the determined candidate terminal being connected to the selected communication interface; and connecting the selected communication interface with the determined candidate terminal.

* * * * *